Patented Dec. 9, 1930                                    1,784,008

UNITED STATES PATENT OFFICE

WILLY O. HERRMANN AND WOLFRAM HAEHNEL, OF MUNICH, GERMANY, ASSIGNORS TO CONSORTIUM FUR ELEKTROCHEMISCHE INDUSTRIE, OF MUNICH, GERMANY

ADHESIVE COMPOSITION

No Drawing. Application filed May 9, 1927, Serial No. 190,130, and in Germany May 11, 1926.

We have found that polymerized vinyl esters are excellent adhesive materials. They are used in a manner similar to that of other resinous materials. For example, a solid polymerized vinyl ester can be dissolved in a solvent and two surfaces brushed with the solution and then pressed together, whereupon they will adhere firmly to one another. Similarly, the surfaces can be firmly joined by brushing them with the molten ester and pressing them together before the ester has time to solidify. The polymerized vinyl ester can be powdered and placed between two surfaces which can then be cemented together by pressure and heat in any known manner. Among the polymerized vinyl esters polymerized vinyl acetate is today of special importance. In our copending application Serial Number 146,841 now matured into Patent #1,710,825, we have shown that it is possible to get from vinyl acetate polymerization products which are soluble also in alcohol and hydrocarbon by conducting the polymerization reaction in the presence of alcohol or hydrocarbon, or by completing the polymerization, in these solvents, of a partially polymerized mixture of vinyl acetate. A known catalyst for polymerization of vinyl acetate, such as benzoyl peroxide, may be used in preparing these soluble forms of polymerized vinyl acetate, and the products so obtained may be used directly as adhesives or the solvent may be evaporated and the solid residue utilized as above described and in other organic solvents. These products are therefore especially apt as adhesive materials. The solutions of polymerized vinyl acetate obtained according to the polymerization process of our copending application Serial Number 146,841 may directly be used as liquid adhesive materials.

Substances possessing suitable physical characteristics may be added to the polymerized vinyl esters to increase their adhesive properties. Under these "suitable substances" we wish to be understood formaldehyde, paraformaldehyde, benzoyl peroxide, softening means such as ethyl lactate, tricresyl phosphate, diethyl phthalate and the like, which increase the elasticity and adhesive properties of resinous materials, high boiling solvents, other adhesive materials and the like. These substances may be added to the polymerized vinyl ester in any way for instance by mixing them together in solid, dissolved or molten state. They can also be added already during the polymerization process of the vinyl ester. It also is possible to get from polymerized vinyl acetate which, according to Klatte U. S. P. 1,241,738 is not soluble in alcohol and benzene, alcoholic or benzene solutions with excellent adhesive properties by adding to the alcohol or benzene other liquids like water, higher boiling solvents, softening means and the like.

For making solutions with excellent adhesive properties the following figures give examples but we wish not to be limited to them. The parts given are to be understood by weight.

Example I 50 parts of polymerized vinyl butyrate are dissolved in 50 parts of denaturated alcohol.

Example II 60 parts of polymerized vinyl acetate are dissolved in 40 parts of denaturated alcohol.

Example III 45 parts of polymerized vinyl acetate are dissolved in a mixture of 45 parts of methanol and 10 parts of isobutyl phthalate.

Example IV 50 parts of polymerized vinyl acetate are melted with 10 parts of amylcinnamate and then dissolved in 40 parts of ethylacetate.

Example V 60 parts of polymerized vinyl acetate are dissolved in 40 parts of toluene.

Example VI

To a solution of 60 parts of polymerized vinyl acetate in 40 parts of denaturated alcohol are added 5 parts of dibutyl acetal.

Example VII 100 parts of vinyl acetate are polymerized by addition of 10 parts of benzoyl peroxide in the presence of 100 parts of denaturated alcohol.

*Example VIII*

100 parts of vinyl acetate and 10 parts of paraformaldehyde are polymerized by the action of chemically active light and the product obtained dissolved in 100 parts of acetone.

In all of the above examples the polymerized vinyl ester may be dissolved in the cold or by any known means such as heating, intimately mixing with the solvent, etc., and the function of the additions, such as isobutyl phthalate, amyl cinnamate, dibutyl acetal, benzoyl peroxide and the like, is to "soften" or increase the elasticity and adhesive properties of the products as already mentioned above.

The polymerized vinyl ester in solid, molten or dissolved state may be used substantially as described for all purposes where adhesive materials are applied i. e. sticking together paper, wood, asbestos, fibrous materials, optical materials, lenses and the like; manufacturing mica paper, micanite, insulating materials, for packing purposes, manufacturing sticking papers, adhesive papers i. e. for photographic purposes, manufacturing glues, cold-glues, sealing-wax, manufacturing noninflammable packing materials.

These adhesive materials as described may be used of course in mixture with other substances e. g. with fillers such as colouring matters, wood-flower, magnesia, talcum, kaolin, resins.

The materials of our invention may be used in any manner and for any purpose known for adhesives.

What we claim is:

1. An adhesive composition containing alcohol-soluble polymerized vinyl acetate, and a softening agent therefor.

2. An adhesive composition containing alcohol-soluble polymerized vinyl acetate, and another adhesive material.

3. An adhesive composition containing alcohol-soluble polymerized vinyl acetate, and an organic solvent therefor.

4. An adhesive composition containing alcohol-soluble polymerized vinyl acetate, a softening agent and an organic solvent therefor, and another adhesive material.

WILLY O. HERRMANN.
WOLFRAM HAEHNEL.